US010374398B2

(12) United States Patent
Strømsvik

(10) Patent No.: US 10,374,398 B2
(45) Date of Patent: Aug. 6, 2019

(54) SUBSEA POWER DISTRIBUTION DEVICE AND SYSTEM

(71) Applicant: FMC Kongsberg Subsea AS, Kongsberg (NO)

(72) Inventor: Torbjørn Strømsvik, Asker (NO)

(73) Assignee: FMC Kongsberg Subsea AS, Kongsberg (NO)

( * ) Notice: Subject to any disclaimer, the term of this patent is extended or adjusted under 35 U.S.C. 154(b) by 279 days.

(21) Appl. No.: 15/313,909

(22) PCT Filed: May 26, 2015

(86) PCT No.: PCT/EP2015/061586
§ 371 (c)(1),
(2) Date: Nov. 23, 2016

(87) PCT Pub. No.: WO2015/181166
PCT Pub. Date: Dec. 3, 2015

(65) Prior Publication Data
US 2017/0141548 A1 May 18, 2017

(30) Foreign Application Priority Data
May 26, 2014 (NO) .................................. 20140650

(51) Int. Cl.
*H02B 1/28* (2006.01)
*H02G 9/00* (2006.01)
(Continued)

(52) U.S. Cl.
CPC ............. *H02B 1/28* (2013.01); *H01F 27/321* (2013.01); *H01F 27/402* (2013.01);
(Continued)

(58) Field of Classification Search
CPC ... H02B 1/28; H02B 1/20; H02B 1/48; H02B 7/06; H01F 27/321; H01F 27/402;
(Continued)

(56) References Cited

U.S. PATENT DOCUMENTS

| 1,815,842 A | 11/1927 | Gay |
| 4,240,122 A | 12/1980 | Smith |

(Continued)

FOREIGN PATENT DOCUMENTS

| DE | 100 05 176 A1 | 8/2001 |
| EP | 2 011 960 A2 | 1/2009 |

(Continued)

OTHER PUBLICATIONS

T. Hazel et al., "Innovative High-Voltage Switchgear Key to Subsea Compression," Offshore (Nov. 4, 2013).
(Continued)

*Primary Examiner* — Zeev V Kitov

(57) ABSTRACT

A subsea power distribution device and system. The subsea power distribution device includes a first watertight housing accommodating at least one transformer having a primary winding and at least one secondary winding, input terminals electrically connected to the primary winding and arranged to be connected to a remote power supply, an output terminal electrically connected to the at least one secondary winding, and switches located within the first watertight housing and arranged to open and close the connections between each secondary winding and a corresponding output terminal. Each output terminal is further connected to an overcurrent breaking device which is further arranged to be connected to a subsea power consuming device. The overcurrent breaking device is arranged in a second watertight housing separate from the first watertight housing and is filled with insulating liquid.

19 Claims, 2 Drawing Sheets

(51) Int. Cl.
*H02H 7/22* (2006.01)
*H01F 27/40* (2006.01)
*H01H 33/55* (2006.01)
*H02B 7/06* (2006.01)
*H01F 27/32* (2006.01)
*H02B 1/20* (2006.01)
*H02B 1/48* (2006.01)
*H02H 3/08* (2006.01)

(52) U.S. Cl.
CPC ............ *H01H 33/555* (2013.01); *H02B 1/20* (2013.01); *H02B 1/48* (2013.01); *H02B 7/06* (2013.01); *H02G 9/00* (2013.01); *H02H 3/08* (2013.01); *H02H 7/22* (2013.01)

(58) Field of Classification Search
CPC .......... H01H 33/555; H02G 9/00; H02H 3/08; H02H 7/22
USPC ....................................... 361/93.1
See application file for complete search history.

(56) References Cited

U.S. PATENT DOCUMENTS

| | | | |
|---|---|---|---|
| 6,420,976 | B1 | 7/2002 | Baggs et al. |
| 6,867,364 | B2 | 3/2005 | Hafskjold et al. |
| 7,952,855 | B2 | 5/2011 | Sletten et al. |
| 10,164,430 | B2 | 12/2018 | Strømsvik et al. |
| 2004/0051615 | A1 | 3/2004 | Hafskjold et al. |
| 2007/0109695 | A1* | 5/2007 | Newlon .................. H02H 7/04 361/38 |
| 2009/0226262 | A1 | 9/2009 | Karstad et al. |
| 2009/0289038 | A1 | 11/2009 | Ronhovd |
| 2013/0011201 | A1* | 1/2013 | Gutierrez ................. F16L 1/26 405/170 |
| 2013/0286546 | A1 | 10/2013 | Hazel et al. |
| 2014/0078622 | A1* | 3/2014 | Crane .................... H02H 3/087 361/8 |
| 2014/0097678 | A1* | 4/2014 | Thibaut .................... H02J 4/00 307/11 |

FOREIGN PATENT DOCUMENTS

| | | |
|---|---|---|
| EP | 1 963 616 B1 | 7/2010 |
| EP | 2 293 407 A1 | 3/2011 |
| EP | 2 717 401 A1 | 4/2014 |
| GB | 2 335 216 A | 9/1999 |
| WO | WO 02/072999 A1 | 9/2002 |
| WO | WO 03/106813 A1 | 12/2003 |
| WO | WO 2007/055594 A1 | 5/2007 |
| WO | WO 2012/034984 A2 | 3/2012 |
| WO | WO 2013/039404 A1 | 3/2013 |

OTHER PUBLICATIONS

N. A. Sølvik et al., "Controlled Subsea Electric Power Distribution with SEPDIS™" ABB Review—Oil, Gas and Petrochemicals (Feb. 2000).

M. J. Heathcote, The J & P Transformer Book, pp. 27 & 530-588 (13th Ed. 2007).

Hazel, Terence, et al. "Subsea high-voltage power distribution." Petroleum and Chemical Industry Conference (PCIC), 2011. Record of Conference Papers Industry Applications Society 58th Annual IEEE. IEEE, 2011.

\* cited by examiner

SUBSEA POWER DISTRIBUTION DEVICE AND SYSTEM

TECHNICAL FIELD

The present invention relates to distribution of electric power to subsea equipment.

More particularly, the invention relates to a subsea overcurrent breaking system, arranged to be connected to a subsea power consuming device and to an output terminal of a subsea power distribution device.

The invention also relates to a subsea power distribution device, comprising a first watertight housing accommodating at least one transformer, the transformer having a primary winding and at least one secondary winding; input terminals, electrically connected to a primary winding of the at least one transformer and arranged to be connected to a remote power supply; a plurality of output terminals, electrically connected to the at least one secondary winding; wherein switches are arranged to break the connections between each secondary winding and a corresponding output terminal, the switches being arranged within the first watertight housing.

The invention also relates to a corresponding subsea power distribution system.

BACKGROUND

In offshore installations there is an increasing use of electrically powered subsea equipment, such as subsea processing installations. Such subsea equipment may include, i.a., compressors, pumps, and any other electrically powered subsea equipment.

The electrical power to be distributed to such subsea equipment may be supplied from land, e.g. an onshore power plant, or from an offshore power generating facility, e.g. on a ship or platform.

Such subsea equipment may have high power requirements, and electric power must usually be transferred across long distances. In order to provide an efficient power transfer across long distances, a high voltage is used for the remote power supply.

There is a need for improved protection against overload or short circuit conditions in subsea power distribution devices and systems. In particular, improved protection while maintaining the possibility of exchanging necessary elements at subsea conditions is desired.

SUMMARY

Disadvantages and/or shortcomings of background art have been overcome by a device and a system as have been set forth in the appended claims.

BRIEF DESCRIPTION OF THE DRAWINGS

The present invention will be discussed in closer detail in the following with reference to the drawings, wherein.

DETAILED DESCRIPTION

Figure 1:
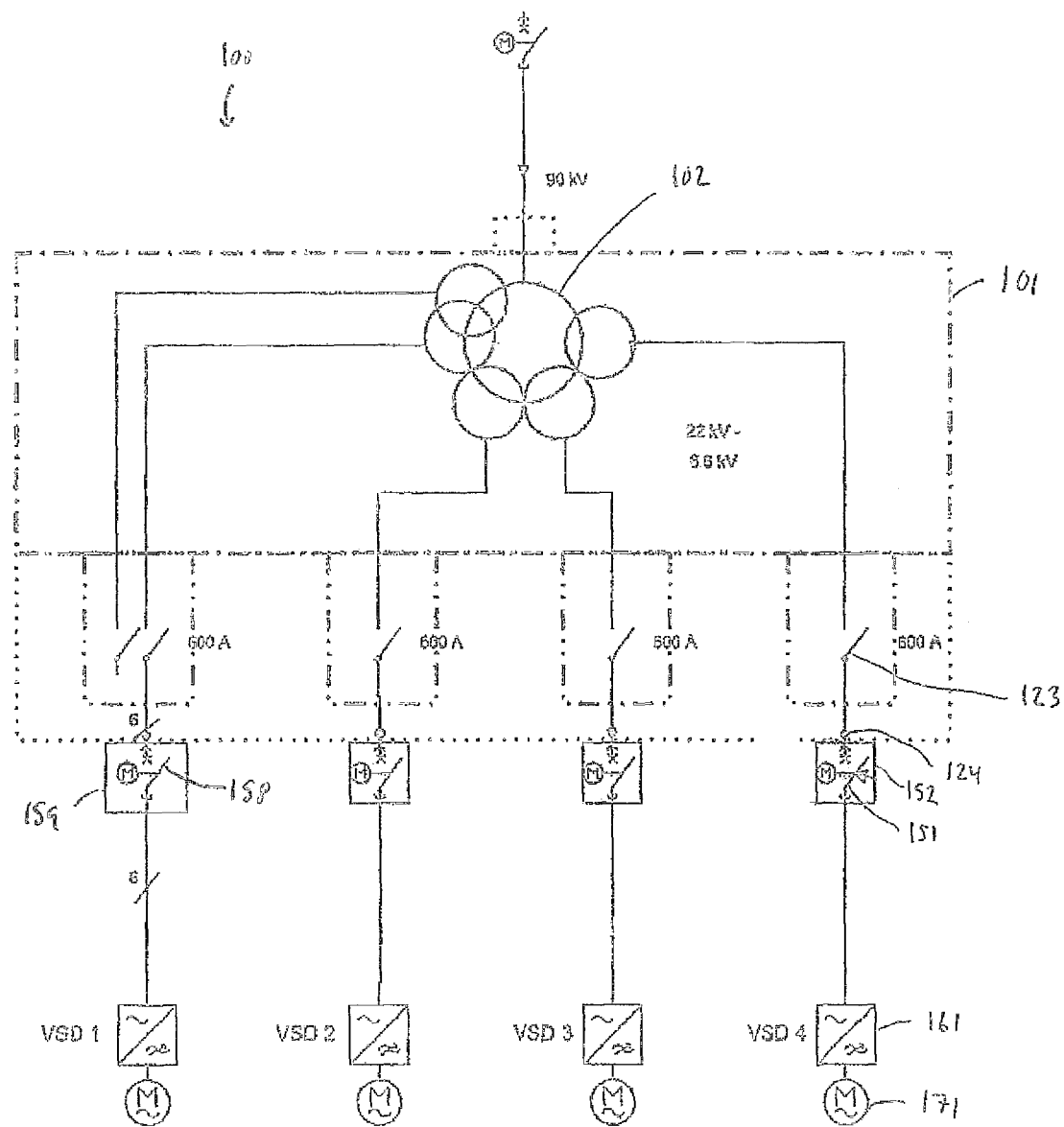
FIG. 1 is an electric single line diagram illustrating aspects of a subsea power distribution system.

FIG. 1 is an electric single line diagram illustrating aspects of a subsea power distribution device.

The subsea power distribution device 100 comprises a first watertight housing 101 which accommodates a transformer 102. Further transformer (s) may also be provided in the first watertight housing 101.

The transformer 102 has a primary winding and at least one secondary winding. In the embodiment shown in FIG. 1 the transformer 102 has a plurality of secondary windings, in particular five secondary windings. Other possible numbers of secondary windings include 1, 2, 3, 4, 6, 7, 8 and more. The primary winding has been illustrated by the inner, larger circle of the symbol for the transformer 102, while the secondary windings have been illustrated by the outer, smaller circles of the symbol for the transformer 102. In this case the subsea power distribution device 100 includes a multiwinding transformer 102.

The subsea power distribution device 100 further includes input terminals that are electrically connected to the primary winding of the transformer 102 and arranged to be connected to a remote power supply.

The remote power supply may have high supply voltage of typically 50-150 kV, for instance 90 kV. The high voltage power may be transferred over a long distance, such as from land, e.g. an onshore power plant, or from an offshore power generating facility, e.g. on a ship or platform, to the subsea site.

The subsea power distribution device 100 further includes a plurality of output terminals, such as the output terminal 124, that are electrically connected to the at least one secondary winding and arranged to be connected to subsea power consuming devices.

Switches, such as the switch 123, are arranged to open/close the connections between each secondary winding and a corresponding output terminal 124. The switches, such as the switch 123, are arranged within the first watertight housing 101.

The arrangement of switches such as switch 123, arranged to open/close the connections between each secondary winding and a corresponding output terminal, makes it possible to isolate each separate secondary circuit in order to disconnect only the circuit which has a fault. When a secondary circuit is to be connected or disconnected, such isolating switches will give the opportunity of performing such a circuit isolation operation without the disconnecting the complete subsea transformer.

The switches used in the subsea power distribution device 100 may e.g. be designed for operating in a voltage range of 10 to 70 kV, or more particularly, in the range of 20 to 36 kV, e.g., 24 kV. Advantageously, dielectric insulating fluid (oil) is used to fill the switch gap, which implies that a switch rated for a particular voltage when operated in air, may operate at a substantially higher (such as approx. three times higher) voltage when insulating fluid (oil) is used.

Advantageously, each switch, e.g. the switch 123, is placed as close as possible to the secondary winding of the transformer 102, so as to minimize the risk of a fault between the secondary winding and the switch, since such a fault cannot be isolated by means of the switch.

Preferably, each secondary winding of the transformer, such as the transformer 102, is provided with a corresponding switch.

Each switch may include a switch actuator, which will be described in closer detail with reference to FIG. 2 below.

As an alternative to the multiwinding transformer 102, the transformer could have been provided with only one secondary winding. In such a case, the plurality of output terminals may be electrically connected to the common secondary winding via at least one busbar.

The output terminals, such as the illustrated output terminal 124, are arranged in a wall of the first watertight housing 101. Each output terminal, such as output terminal 124, is connected to an overcurrent breaking device 151 which is further arranged to be connected to a subsea power consuming device, which in turn may, e.g., include a VSD (variable speed drive) 161 and an electric motor 171. As used herein, the term power consuming device should be understood to mean either one single power consuming unit or a power distribution circuit segment which may include a plurality of power consuming units.

The overcurrent breaking device 151 is arranged within a second watertight housing 152 which is separate from the first watertight housing 101. Advantageously, separate watertight housings are used for each overcurrent breaking device.

The concept of arranging the overcurrent breaking device 151 within a second watertight housing 152 which is separate from the first watertight housing facilitates retrieving the overcurrent breaking device 151 from its subsea location to a topside location for the purpose of servicing or repairing. Service or repair may be necessary e.g. when an overcurrent situation has occurred, in particular if the overcurrent breaking device includes a fuse or similar disposable component. The first and second watertight housings may be filled with an electrically non-conducting liquid, e.g. oil.

The system comprising the subsea overcurrent breaking device, arranged in an oil-filled environment in the watertight housing, may be denoted a subsea overcurrent breaking system.

The connection between the output terminal 124 and the overcurrent breaking device 151 may include a wet-mated connection. This makes it possible to connect or disconnect the overcurrent breaking device 151, included in the second watertight housing 152, to or from the first watertight housing 101 in a subsea environment. The electrical connection and mechanical fixing between the first and second watertight housings may advantageously be performed in one common operation. The mechanical force to make such a mating is quite high. The movement of the housing towards the tank 101 may be done by means of mechanical assisted clamping mechanism, either autonomous electrically or powered by a ROV vehicle.

The arrangement of a wet-mated connection facilitates the retrieving of the overcurrent breaking device 151, with its housing 152, from its subsea location to a topside location, e.g. by means of a ROV, for the purpose of servicing or repairing. The overcurrent breaking device may be arranged to break the connection between the output terminal and the subsea power consuming device when the current through the overcurrent breaking device exceeds a predetermined threshold.

The overcurrent breaking device may in an example be a circuit breaker (CB), which will break at short circuit or overload conditions. In another example the overcurrent breaking device may be a fuse, such as a medium voltage fuse, which must be replaced after a fault-breaking. In yet another example the overcurrent breaking device may include a controllable semiconductor switch, or PEB (Power Electronic Breaker). All of these devices are advantageously arranged in oil-filled environment.

The pressure inside the housing 152 may be equal to ambient sea water pressure. The ambient sea water pressure will be dependent on the actual depth of the subsea location wherein the present subsea power distribution device is arranged. For instance, the pressure may be about 100 bar at 1000 m sea depth, 300 bar at 3000 m sea depth and 500 bar at 5000 m sea depth.

In order to obtain equal pressure in the second watertight housing of the subsea overcurrent breaking device and the ambient sea water, the second watertight housing may be pressure-compensated.

The PEB is not necessarily completely isolating, and the switch 151 must be open to complete the breaking. Both the PEB and the CB can be used for switching on and off load current many times. The CB can, however, break short-circuit currents a limited number of times. Then it has to be retrieved and serviced.

The switch 123 provided in the first watertight housing 101 may include a switch actuator. The opening of this switch 123 is only possible when the breaking device is open.

The first watertight housing may be configured with a first compartment and a second compartment separate from the first compartment. The transformer may be arranged within the first compartment and the switches may be arranged in the second compartment. The first compartment and the second compartment may be oil-filled.

In FIG. 1, the two leftmost secondary windings of the transformer 102 are connected to respective switches 123 which are included in the watertight housing 101 or in a compartment of the watertight housing 101. The two switches are further connected to a double output terminal, which is further connected to a double overcurrent breaking device 158 included in a watertight housing 159. Hence, in the subsea power distribution device 100, a multiple output terminal may be further connected to a multiple overcurrent breaking device 158 which is further arranged to be connected to a multiple subsea power consuming device. In such an aspect, the multiple overcurrent breaking device 158 may be arranged in a separate watertight housing 159 separate from the first watertight housing 101.

Figure 2:
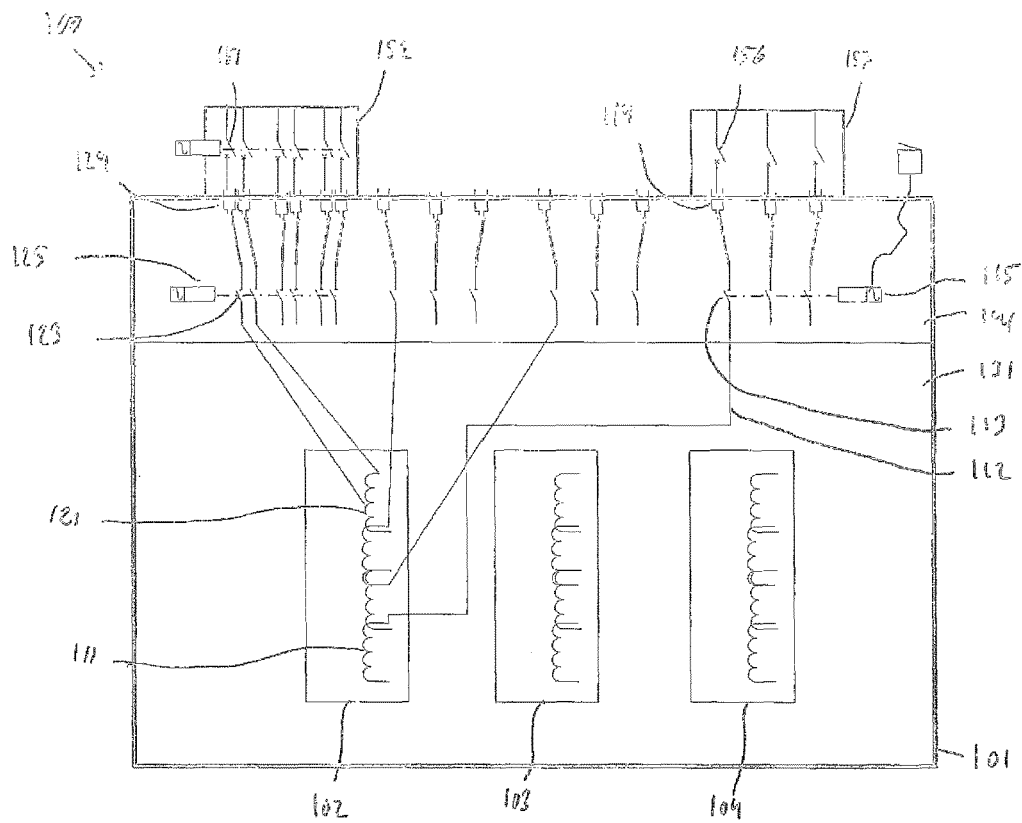
FIG. 2 is a simplified mechanical drawing illustrating further aspects of a subsea power distribution device.

FIG. 2 is a schematic block diagram illustrating further aspects of a subsea power distribution device.

The subsea power distribution device comprises a first watertight housing 101 which accommodates at least one transformer 102. More than one transformer may be provided in the first watertight housing. Each additional transformer 103, 104 may e.g. be equal to, similar to, or different from the transformer 102.

The transformer 102 has a primary winding and a plurality of secondary windings, i.e., a multiwinding transformer. The plurality of secondary windings, which in this example includes 5 secondary windings, has been illustrated within the transformer 102.

Each secondary winding may feed one power consuming device. As used herein, the term power consuming device should be understood to mean either one single power consuming unit or a power distribution circuit segment which may include a plurality of power consuming units.

Although not illustrated in FIG. 2, the subsea power distribution device 100 includes input terminals that are electrically connected to the primary winding. These input terminals are also arranged to be connected to a remote power supply.

The remote power supply may have high supply voltage of typically 50-150 kV, for instance 90 kV. The high voltage power may be transferred over a long distance, such as from land, e.g. an onshore power plant, or from an offshore power generating facility, e.g. on a ship or platform, to the subsea site.

The power distribution device 100 further includes output terminals which are electrically connected to the secondary windings and arranged to be connected to subsea power consuming devices.

The secondary windings may typically supply an operating voltage in the range of 10 to 40 kV, or more particularly, in the range of 20 to 36 kV, e.g., 24 kV.

Further, switches are arranged to open and close the connections between each secondary winding and a corresponding output terminal. The switches, including the illustrated switches 113 and 123, are arranged within the watertight housing.

The arrangement of the switches arranged to open and close the connections between each secondary winding and a corresponding output terminal makes it possible to isolate each separate secondary circuit in order to disconnect only the circuit which has a fault. When a secondary circuit is to be connected or disconnected, such isolating switches will give the opportunity of performing such a circuit isolation operation without the disconnecting the complete subsea transformer.

The switches used in the power distribution device may e.g. be designed for operating in a voltage range of 10 to 40 kV, or more particularly, in the range of 20 to 36 kV, e.g., 24 kV. Advantageously, dielectric insulating fluid (oil) is used to fill the switch gap, which implies that a switch rated for a particular voltage when operated in air, may operate at a substantially higher (such as approx. three times higher) voltage when insulating fluid (oil) is used.

As a simplified, illustrative example, shown in FIG. 2, one secondary winding 111 in the transformer 102 is connected through a conductor 112 to a switch 113. A further connector is connected between the switch 113 and the output terminal 114, which is arranged to be connected to a subsea power consuming device. Likewise, another secondary winding 121 in the transformer 102 is connected through a conductor 122 to a switch 123. A further connector is connected between the switch 123 and the output terminal 124, which is also arranged to be connected to a subsea power consuming device (not illustrated) via an overcurrent breaking device 151.

Further possible details of the subsea power consuming device have been described above with reference to FIG. 1.

The overcurrent breaking device 151 is arranged within a second watertight housing 152 which is separate from the first watertight housing 101. The second watertight housings may be filled with an electrically non-conducting liquid, e.g. oil.

The connection between the output terminal 124 and the overcurrent breaking device 151 may include a wet-mated connection, as has been further described above with reference to FIG. 1. Further aspects of the overcurrent breaking device 151 have also been further described above with reference to FIG. 1.

Advantageously, each switch, e.g. the switch 123, is placed as close as possible to the secondary winding of the transformer, so as to minimize the risk of a fault between the secondary winding and the switch, since such a fault cannot be isolated by means of the switch.

Preferably, each secondary winding of the transformer, such as the transformer 102, is provided with a corresponding switch.

Each switch may include a switch actuator, which actuates the switching function of the switch. For instance, the switch 113 is actuated by the switch actuator 115. Preferably, as shown, two other, correspondingly operated switches are actuated by the same switch actuator 115.

Likewise, the switch 123 is actuated by another switch actuator 125. Preferably, as shown, two other, correspondingly operated switches are actuated by the same switch actuator 125.

In a particular advantageous aspect, the watertight housing 101 is configured with a first compartment 131 and a second compartment 141. The second compartment 141 is separate from the first compartment 131. Further, in this configuration, the transformer is arranged within the first compartment 131 while the switches are arranged in the second compartment 141.

The first compartment 131 and the second compartment 141 are advantageously oil-filled. Advantageously, the oil used is a dielectric isolating oil of a type known as transformer fluid. An example is known as MIDEL 7131.

The first 131 and second 141 compartments may be configured as separate parts or as portions of a divided enclosure. The compartments, including the divided enclosure, should be designed and arranged to withstand subsea environment conditions, i.e. water pressure, salt, temperature variations, etc. To this end, the compartments may be made of a strong steel casing with cooling fins for heat exchange. The enclosure may advantageously include a top cover and suitable bushing boxes. Appropriate seals, closures, penetrators and connectors to sea-water for subsea environment may be chosen as appropriate by the skilled person.

In one aspect, the switch actuator is (or the switch actuators are) contained within the watertight housing. Hence, as shown, the switch actuators 115 and 125 are contained within the watertight housing 101.

More specifically, in the configuration wherein the watertight housing 101 has a first compartment 131 and a second compartment 141, the switch actuator is advantageously contained within the second compartment 141. In this configuration, electric penetrators are needed between the first and second compartments.

In an alternative aspect, the switch actuator is arranged external to the watertight housing. In this case, it may be necessary to arrange a mechanical shaft through the shell of the watertight housing. This leads however to certain disadvantages with respect to obtaining a durable and reliable seal between the shaft and the shell of the watertight housing. This problem has been solved by arranging a magnetic coupling between the actuator's electric motor, arranged outside the watertight housing, and a movable mechanism of the switch.

In any of the above aspects, the switch actuator may be connected to and arranged to be controlled by a control unit which is arranged separately from the watertight housing.

The switch actuator may advantageously be an electrical switch actuator, e.g. including a motor, mechanical drive gear, a power supply such as a battery, and a control unit. The electric switch actuator may be configured to be fail safe. The battery may include an internal battery, an external battery, or a combination.

Alternatively, the switch actuator may be a hydraulic or electro-hydraulic switch actuator.

Figures 3, 4:
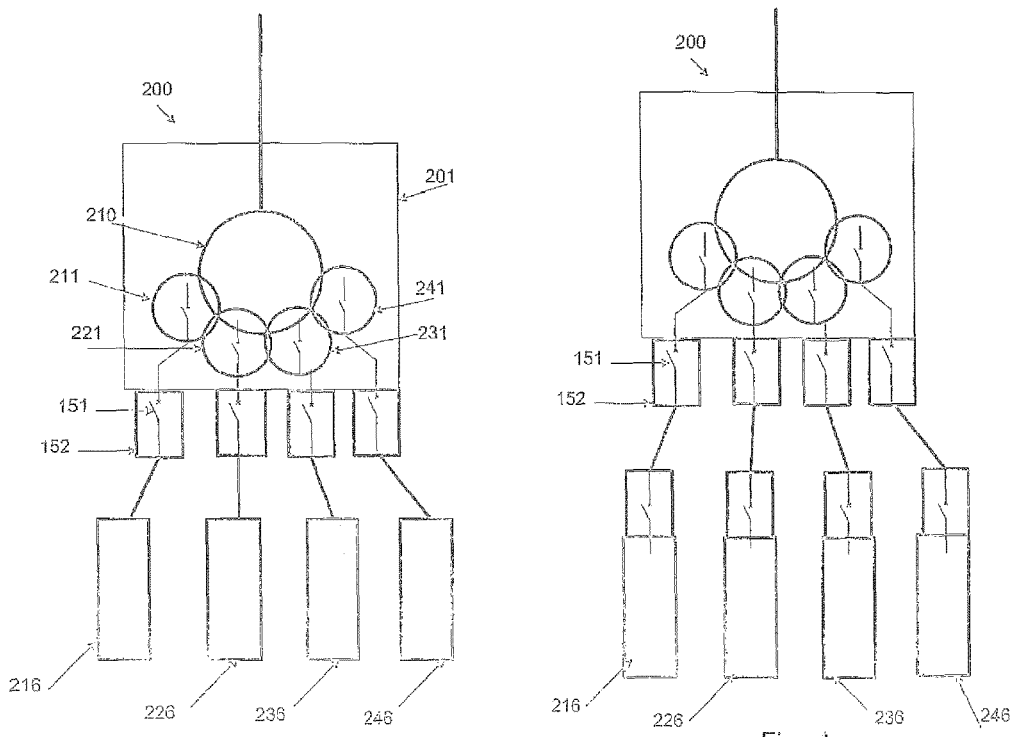
FIG. 3 is a schematic block diagram illustrating certain further aspects of a subsea power distribution device.
FIG. 4 is a schematic block diagram illustrating certain further aspects of a subsea power distribution device.

FIGS. 3 and 4 are schematic block diagrams illustrating certain further aspects of a subsea power distribution device.

The subsea power distribution device 200 comprises a watertight housing 201 in the same way as the device 101 described above with reference to FIG. 2. The watertight housing 201 accommodates a transformer which has a primary winding, schematically illustrated at 210, and a plurality of secondary windings; namely; the four secondary windings 211, 221, 231 and 241. Input terminals (schematically illustrated as one line) are electrically connected to the primary winding 210 and arranged to be connected to a remote power supply.

The subsea power distribution device 200 further comprises output terminals, which are electrically connected to the secondary windings and arranged to be connected to subsea power consuming devices, illustrated at 216, 226, 236 and 246. Switches, illustrated in FIGS. 3 at 211, 221, 231 and 241 respectively, are arranged to break the connections between each secondary winding and a corresponding output terminal which leads to a corresponding subsea power consuming device. The switches are arranged within the watertight housing, in a corresponding way as disclosed and illustrated for the power distribution device 100 illustrated in FIG. 2.

Overcurrent breaking devices, such as the overcurrent breaking device 151, is arranged within respective watertight housings, such as the second watertight housing 152, which is separate from the first watertight housing 201.

Additionally, the subsea power distribution device 200 may include any of the optional features, or any combination of the optional features, which have already been described above for the power distribution device 100 illustrated in FIGS. 1 and/or 2.

FIG. 4 illustrates a similar configuration as that shown in FIG. 3. Each subsea power consuming device may include an additional power switch within the device itself, or more specifically, as suggested in FIG. 4, in a separate switch unit attached to or included in the same housing as the corresponding subsea power consuming device. The power switches included in the power consuming device may e.g. be a power switch in a Variable Speed Device (VSD).

The subsea power distribution device disclosed above, with any combination of aspects and possible or optional features, may be included in a subsea power distribution system. The subsea power distribution system comprises a remote power supply, with a high voltage of typically 50-150 kV, for instance 90 kV. The high voltage power may be transferred over a long distance, such as from land, e.g. an onshore power plant, or from an offshore power generating facility, e.g. on a ship or platform, to the subsea site.

The subsea power distribution system further comprises a subsea power distribution device as disclosed above, e.g. as shown and described with reference to FIGS. 1, 2, 3 and 4, and a plurality of subsea power consuming devices, such as compressors, pumps, etc.

The subsea power distribution system also includes primary electrical connections which interconnect the remote power supply and the input terminals of the subsea power distribution device.

The subsea power distribution system also includes secondary electrical connections which interconnect the output terminals of the subsea power distribution device and the subsea power consuming devices.

It should be appreciated by the skilled person that the disclosed subsea power distribution device and subsea power distribution system may employ three-phase AC or one-phase AC supply voltage/current, circuits and elements.

Various aspects of the disclosed subsea power distribution device and subsea power distribution system may have at least some of the following advantages:

Improved protection against overload or short circuit conditions, while maintaining the possibility of exchanging necessary elements at subsea conditions.

A ground fault, or another electrical fault, in one secondary circuit may have no impact on the other secondary circuits.

The possibility of isolating one faulty circuit so this fault does not influence the transformer operation, and Installation or removal of subsea power consuming devices can be done with the remaining parts of the subsea power distribution system in operation, e.g. during maintenance and/or repair.

Shutdown or disconnection of the entire power distribution system would have substantial operational concerns, e.g. loss of operational time and costs. The disclosed subsea power distribution device and system overcomes such shortcomings of related background solutions.

The invention claimed is:

1. A subsea overcurrent breaking system comprising:
   a plurality of subsea overcurrent breaking devices arranged to be connected between subsea power consuming devices and output terminals of a subsea power distribution device; and
   a plurality of first watertight housings, each subsea overcurrent breaking device being arranged in an oil-filled environment in a corresponding one of the first watertight housings;
   wherein the subsea power distribution device includes at least one transformer which is arranged in a second watertight housing that is separate from the first watertight housings, the transformer comprising a primary winding and a number of secondary windings, each secondary winding being connected to a corresponding output terminal of the subsea power consuming device;
   wherein the subsea power distribution device further includes a number of switches, each of which is arranged to open and close the connection between a secondary winding and a corresponding output terminal, the switches being arranged within the second watertight housing; and
   wherein each subsea overcurrent breaking device is arranged to be connected between an output terminal and a corresponding subsea power consuming device.

2. The subsea overcurrent breaking system according to claim 1, wherein the subsea overcurrent breaking device is arranged to break a connection between the output terminal of the subsea power distribution device and the subsea power consuming device when a current through the subsea overcurrent breaking device exceeds a predetermined threshold.

3. The subsea overcurrent breaking system according to claim 2, wherein the subsea overcurrent breaking device includes a circuit breaker, a fuse or a controllable semiconductor switch.

4. The subsea overcurrent breaking system according to claim 1, wherein a connection between the output terminal of the subsea power distribution device and the subsea overcurrent breaking device includes a wet-mated connection.

5. The subsea overcurrent breaking system according to claim 1, wherein the pressure inside the first watertight housing is equal to ambient sea water pressure.

6. The subsea overcurrent breaking system according to claim 5, wherein the first watertight housing is pressure-compensated to obtain equal pressure inside the first watertight housing and ambient sea water pressure.

7. The subsea overcurrent breaking system according to claim 1, wherein the subsea overcurrent breaking system is arranged to be retrieved from a subsea location to a topside location for the purpose of servicing or replacing the subsea overcurrent breaking device.

8. A subsea power distribution device comprising:
a first watertight housing within which at least one transformer is positioned, the transformer having a primary winding and a number of secondary windings;
an input terminal which is electrically connected to the primary winding and is arranged to be connected to a remote power supply;
a number of output terminals, each of which is electrically connected to a secondary winding; and
a number of switches which are arranged to open and close the connections between each secondary winding and a corresponding output terminal, the switches being arranged within the first watertight housing;
wherein each output terminal is further connected to an overcurrent breaking device which is arranged to be connected to a subsea power consuming device, the overcurrent breaking device being arranged in a second watertight housing separate from the first watertight housing.

9. The subsea power distribution device according to claim 8, wherein the transformer has one secondary winding and the output terminals are electrically connected to the secondary winding via a number of busbars.

10. The subsea power distribution device according to claim 8, wherein the transformer has a plurality of secondary windings and the output terminals are electrically connected to respective secondary windings.

11. The subsea power distribution device according to claim 8, wherein the first and second watertight housings are filled with an electrically nonconducting liquid.

12. The subsea power distribution device according to claim 8, wherein the connection between the output terminal and the overcurrent breaking device includes a wet-mated connection.

13. The subsea power distribution device according to claim 8, wherein the overcurrent breaking device is arranged to break the connection between the output terminal and the subsea power consuming device when the current through the overcurrent breaking device exceeds a predetermined threshold.

14. The subsea power distribution device according to claim 13, wherein the overcurrent breaking device is selected from a set consisting of a circuit breaker, a fuse, and a semiconductor switch.

15. The subsea power distribution device according to claim 8, wherein each switch includes a switch actuator.

16. The subsea power distribution device according to claim 15, wherein the first watertight housing is configured with a first compartment and a second compartment separate from the first compartment, and wherein the transformer is arranged within the first compartment and the switches are arranged in the second compartment.

17. The subsea power distribution device according to claim 16, wherein the first compartment and the second compartment are filled with an electrically non-conducting liquid.

18. The subsea power distribution device according to claim 8, wherein at least two output terminals are connected to a multiple overcurrent breaking device which is arranged to be connected to a multiple subsea power consuming device, and wherein the multiple overcurrent breaking device is arranged in a watertight housing separate from the first watertight housing.

19. A subsea power distribution system, comprising:
a remote power supply;
a subsea power distribution device which includes:
a first watertight housing within which at least one transformer is positioned, the transformer having a primary winding and a number of secondary windings;
an input terminal which is electrically connected to the primary winding and is arranged to be connected to the remote power supply;
a number of output terminals, each of which is electrically connected to a secondary winding; and
a number of switches which are arranged to open and close the connections between each secondary winding and a corresponding output terminal, the switches being arranged within the first watertight housing;
wherein each output terminal is further connected to an overcurrent breaking device which is arranged to be connected to a subsea power consuming device, the overcurrent breaking device being arranged in a second watertight housing separate from the first watertight housing;
a primary electrical connection which interconnects the remote power supply and the input terminal of the subsea power distribution device; and
secondary electrical connections which interconnect the output terminals of the subsea power distribution device and the subsea power consuming devices.

* * * * *